US012107325B2

(12) United States Patent
Gilbert et al.

(10) Patent No.: US 12,107,325 B2
(45) Date of Patent: Oct. 1, 2024

(54) MOVABLE ANTENNA SUPPORT

(71) Applicant: IXBLUE, Saint-Germain-en-Laye (FR)

(72) Inventors: Guillaume Gilbert, Saint-Germain-en-Laye (FR); Jean-Luc Ginestet, Saint-Germain-en-Laye (FR)

(73) Assignee: EXAIL, Saint-Germain-en-Laye (FR)

( * ) Notice: Subject to any disclaimer, the term of this patent is extended or adjusted under 35 U.S.C. 154(b) by 98 days.

(21) Appl. No.: 17/802,876

(22) PCT Filed: Feb. 25, 2021

(86) PCT No.: PCT/EP2021/054693
§ 371 (c)(1),
(2) Date: Aug. 26, 2022

(87) PCT Pub. No.: WO2021/170723
PCT Pub. Date: Sep. 2, 2021

(65) Prior Publication Data
US 2023/0078679 A1 Mar. 16, 2023

(30) Foreign Application Priority Data
Feb. 28, 2020 (FR) ...................................... 2002023

(51) Int. Cl.
*H01Q 1/28* (2006.01)
*H01Q 1/18* (2006.01)
*H01Q 3/04* (2006.01)

(52) U.S. Cl.
CPC ................ *H01Q 1/28* (2013.01); *H01Q 1/18* (2013.01); *H01Q 3/04* (2013.01)

(58) Field of Classification Search
CPC ............... H01Q 1/28; H01Q 1/18; H01Q 3/04
See application file for complete search history.

(56) References Cited

U.S. PATENT DOCUMENTS

| | | | | |
|---|---|---|---|---|
| 5,419,521 | A | 5/1995 | Matthews | |
| 2010/0149059 | A1* | 6/2010 | Patel | H01Q 3/08 343/765 |
| 2010/0253586 | A1* | 10/2010 | Tippit | H01Q 1/125 343/757 |
| 2012/0286990 | A1* | 11/2012 | Anderson | H01Q 15/02 342/352 |

FOREIGN PATENT DOCUMENTS

FR 2085170 12/1971

OTHER PUBLICATIONS

International Search Report for PCT/EP2021/054693, dated May 4, 2021, 5 pages.
Written Opinion of the ISA for PCT/EP2021/054693, dated May 4, 2021, 8 pages.

* cited by examiner

*Primary Examiner* — Awat M Salih
(74) *Attorney, Agent, or Firm* — NIXON & VANDERHYE

(57) ABSTRACT

Disclosed is an antenna support including: a base; at least one crown including a unit for securing an antenna element; a guide for guiding the crown in rotation around an axis of rotation; a drive for rotating the crown around the axis of rotation; and a unit for determining the angular position of the crown around the axis of rotation. The guide, the drive and the determining unit are mounted on the base on the outer side of the crown.

14 Claims, 3 Drawing Sheets

MOVABLE ANTENNA SUPPORT

This application is the U.S. national phase of International Application No. PCT/EP2021/054693 filed Feb. 25, 2021 which designated the U.S. and claims priority to FR 2002023 filed Feb. 28, 2020, the entire contents of each of which are hereby incorporated by reference.

TECHNICAL FIELD OF THE INVENTION

The present invention generally relates to the field of antennas, and more particularly to that of satellite communication antennas, which require stabilized platforms with one or more degrees of freedom.

It relates more particularly to an antenna support comprising a base, at least one crown comprising means for securing an antenna element, means for guiding the crown in rotation around an axis of rotation, means for driving the crown in rotation around the axis of rotation, and means for determining the angular position of the crown around the axis of rotation.

The invention also relates to a vehicle, for example an aircraft, comprising an antenna fixed to an antenna support as mentioned above.

STATE OF THE ART

To enable an aircraft to communicate with the outside, it is known to equip it with a flat mechanical scanning antenna adapted to communicate with a satellite.

Such an antenna comprises a source of emission of a divergent beam and means for guiding this beam in a desired direction. These guidance means are mounted so as to rotate around an axis, so that the beam can be constantly oriented towards the desired satellite, even when the aircraft changes course or altitude.

It is then known to use a stabilized platform to receive this mechanically scanned flat antenna, which provides the aforementioned guide means with the desired mobility or mobility in rotation.

This platform is generally integrated into the antenna itself.

PRESENTATION OF THE INVENTION

The present invention proposes a support for an antenna which is not integrated therein and which is therefore adaptive in the sense that it makes it possible to receive different models of antennas.

More particularly, according to the invention, a support is proposed as defined in the introduction, in which the guide means, the drive means and the determination means are mounted on the base on the outer side of the crown.

Thus, thanks to the invention, the antenna can be wholly or partly fixed inside the crown, which offers it an ideal position to perform its function of communication with a satellite and which makes it possible to avoid that it interferes with the elements of the support.

The architecture of this support also has the advantage of being modular, in the sense that it makes it possible to receive antennas of different sizes by changing only the base and the crown, all the other elements remaining practically unchanged.

The proposed support can also have a very reduced thickness (measured along the axis of rotation), so that it can be easily used in the aeronautical field since it will generate, once placed under a radome of equally reduced dimensions, very low drag.

Other advantageous and non-limiting characteristics of the antenna support according to the invention, taken individually or according to all the technically possible combinations, are the following ones:

- the guide means comprise at least three rollers distributed around the crown;
- the guide means comprise six rollers distributed in pairs on frames mounted on the base;
- each frame is pivotally mounted on the base, around a pivot axis parallel to the axis of rotation;
- one of the frames is mounted movable in translation on the base along an axis inclined or orthogonal with respect to the axis of rotation (preferably radial with respect to this axis), said frame being returned in the direction of the crown by an elastic return system;
- the drive means comprise a motor which drives a belt wound around the crown;
- the belt is completely metallic;
- the drive means comprise two return pulleys located on either side of the belt, between the motor and the crown;
- at least one of the return pulleys is mounted to move in translation on the support along an axis orthogonal to the axis of rotation and is biased against the belt by a tensioning system;
- preferably, this axis is a median axis with respect to the orientations of the two straight and taut strands of the belt against which the return pulley bears;
- the determination means comprise an encoder strip wound around the crown;
- the determining means comprise two encoder readers fixed to the support and angularly separated from each other around the axis of rotation;
- there is provided at least a second crown comprising means for securing a second antenna element, second means for guiding the second crown in rotation around the axis of rotation, second means for driving the second crown in rotation around the axis of rotation, and second means for determining the angular position of the second crown around the axis of rotation;
- the second guide means, the second drive means and the second determining means are mounted on the base on the outer side of the second crown;
- there is provided at least a third crown comprising means for securing a third antenna element, third means for guiding the third crown in rotation around the axis of rotation, third means for driving the third crown in rotation around the axis of rotation, and third means for determining the angular position of the third crown around the axis of rotation;
- the third guide means, the third drive means and the third determination means are mounted on the base on the outer side of the third crown.

The invention also proposes a set of two antenna supports as mentioned above, in which each crown of one of the antenna supports has a different diameter from that of each crown of the other of the antenna supports, and wherein the guide means, part of the drive means and part of the determination means are identical in the two antenna supports.

The invention also proposes a vehicle comprising means of propulsion, an antenna and an antenna support as mentioned above.

Of course, the different characteristics, variants and embodiments of the invention can be associated with each other in various combinations insofar as they are not incompatible or exclusive of each other.

DETAILED DESCRIPTION OF THE INVENTION

The following description with reference to the appended drawings, given by way of non-limiting examples, will make it clear what the invention consists of and how it can be implemented.

Figure 1:
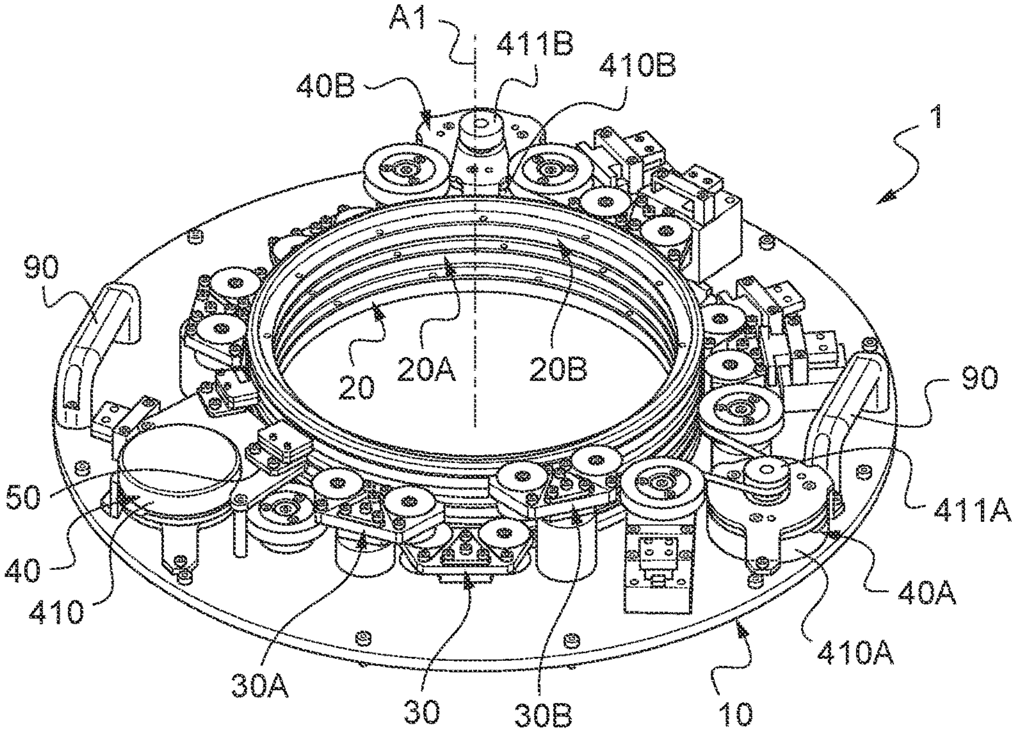
FIG. 1 is a schematic perspective view of an antenna support according to the invention.

In FIG. 1, there is shown an example of antenna support 1 according to the invention.

Figure 6:
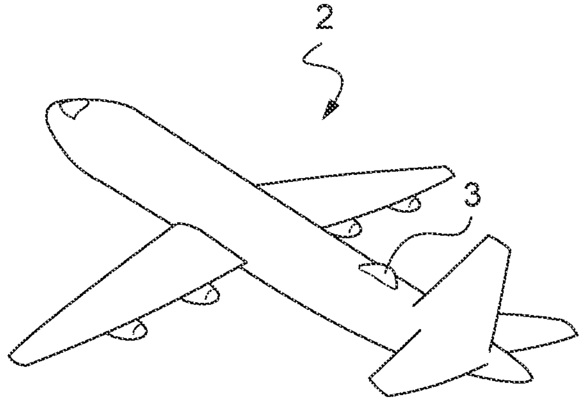
FIG. 6 is a schematic perspective view of an aircraft equipped with the antenna support of FIG. 1.

In this example, as shown in FIG. 6, the antenna support 1 is specifically designed to be installed under a radome 3 of an aircraft 2, in order to accommodate a mechanically scanned antenna.

Of course, as a variant, this support could be used in any other type of vehicle (car, ship, etc.) and even on terrestrial infrastructures. It could also accommodate other types of antennas.

The antenna support 1 is modular in the sense that it can accommodate antennas having different numbers of functions. In the example illustrated in FIG. 1, this antenna support 1 comprises three distinct mobile stages, which makes it possible to offer three functions to the antenna, namely here an azimuth adjustment (i.e. a target heading adjustment), an elevation adjustment (i.e. a target height adjustment), and a transmit and receive frequency adjustment.

Of course, as a variant, it could comprise only one stage and only one function, or two stages and two functions, or even a greater number of stages and functions. However, a number of stages comprised between 1 and 3 will be preferred.

Finally, this antenna support 1 is modular in the sense that by changing a small number of its components, it can accommodate antennas of various shapes and sizes.

As shown in FIG. 1, this antenna support 1 here comprises a base 10 which supports, for each of the three stages:

- a crown 20,
- means 30 for guiding the crown 20 in rotation around an axis of rotation A1,
- means 40 for driving the crown 20 in rotation around the axis of rotation A1, and
- means 50 for determining the angular position of the crown 20 around the axis of rotation A1.

According to a particularly advantageous characteristic of the invention, the guide means 30, the drive means 40 and the means 50 for determining each stage are mounted on the base 10, on the outer side of the crown 20.

By this is meant that, the crown 20 defining a cylinder of revolution around the axis of rotation A1, the radius of which is equal to the minimum radius of the crown 20, the guide means 30, the drive means 40 and the determination means 50 are mounted on the outer side of this cylinder of revolution.

The antenna element which is carried by the crown is for its part intended to be installed mainly inside this cylinder of revolution.

The various elements constituting the antenna support 1 can be described in detail, by focusing on only one of the stages of this antenna support 1, the elements of the other stages being almost identical.

Figure 5:
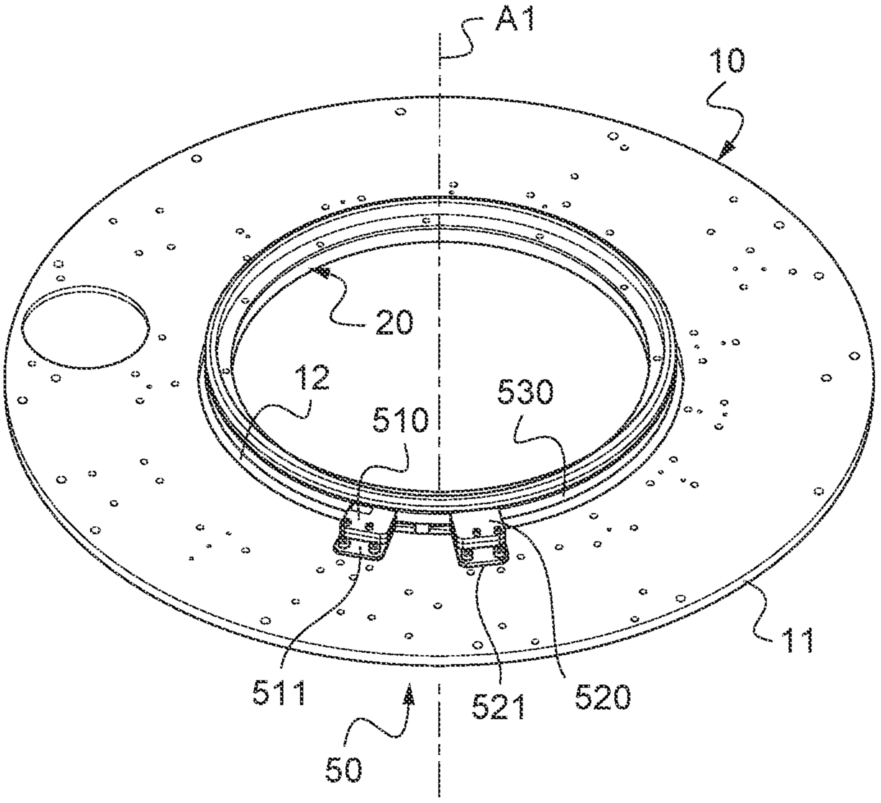
FIG. 5 is a schematic perspective view of the base and the means for determining the antenna support of FIG. 1.

The base 10 is clearly visible in FIG. 5.

It is presented here in the form of an annular plate, the general shape of which is substantially of revolution around the axis of rotation A1.

It is therefore defined between an outer peripheral edge 11 and an inner peripheral edge 12, both of circular shapes.

This base 10 is here pierced with tapped holes, part of which allows the components of the three stages of the antenna support 1 to be fixed there.

As clearly shown in FIG. 1, four of these tapped holes are used to attach two handles 90 to the base 10. These two handles 90, located diametrically opposite, here allow easy handling of the antenna support 1.

The base 10 is here provided to be fixed to the chassis of the vehicle, that is to say here to the structure of the aircraft 2.

For this purpose, it comprises holes located at its periphery, which allow it to be screwed onto the structure of the aircraft 2.

Figure 2:
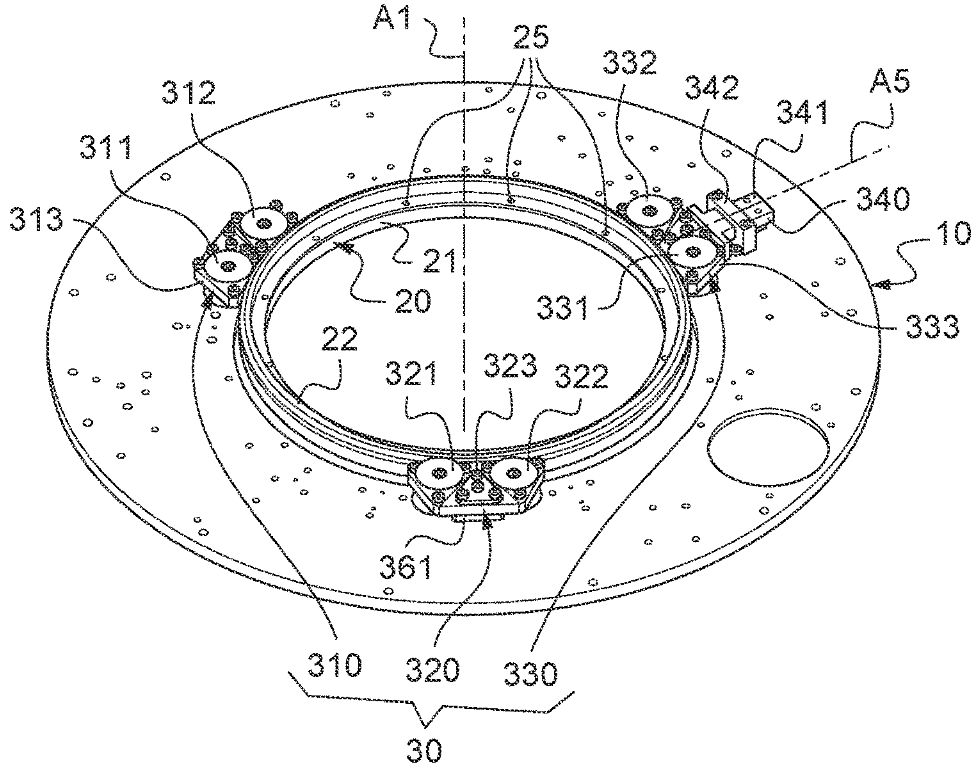
FIG. 2 is a schematic perspective view of the base and the guide means of the antenna support of FIG. 1.

As shown in FIG. 2, the crown 20 has the shape of a crown, substantially of revolution around the axis of rotation A1.

It comprises an outer crown 22 which carries, projecting from its inner face, a peripheral rib 21. The crown thus has an L-shaped cross-section (the base of this L being oriented towards the axis of rotation A1 and forming the peripheral rib 21).

This crown 20 comprises securing means 25 of an antenna element.

These securing means 25 are preferably provided in such a way as to make it possible to fix the antenna element in a removable manner (that is to say not permanently) on the crown 20.

They are here in the form of tapped holes made through the peripheral rib 21, along axes parallel to the axis of rotation A1. Here, these tapped holes are regularly distributed around this axis of rotation A1.

For reasons of mass reduction and installation constraints, the crown 20 has an outer diameter smaller than the inner diameter of the base 10.

The guide means 30, which are fixed to the base 10, are then provided to cooperate with this crown 20 so as to allow it a single degree of freedom, namely rotational mobility around the axis of rotation A1.

These guide means could take very different forms. They could thus be made up of three fixed pads or three rotating rollers distributed around the crown 20.

Here, they rather comprise six rotating rollers 311, 312, 321, 322, 331, 332, which are distributed in pairs over three frames 313, 323, 333 mounted on the base 10.

Figure 3:
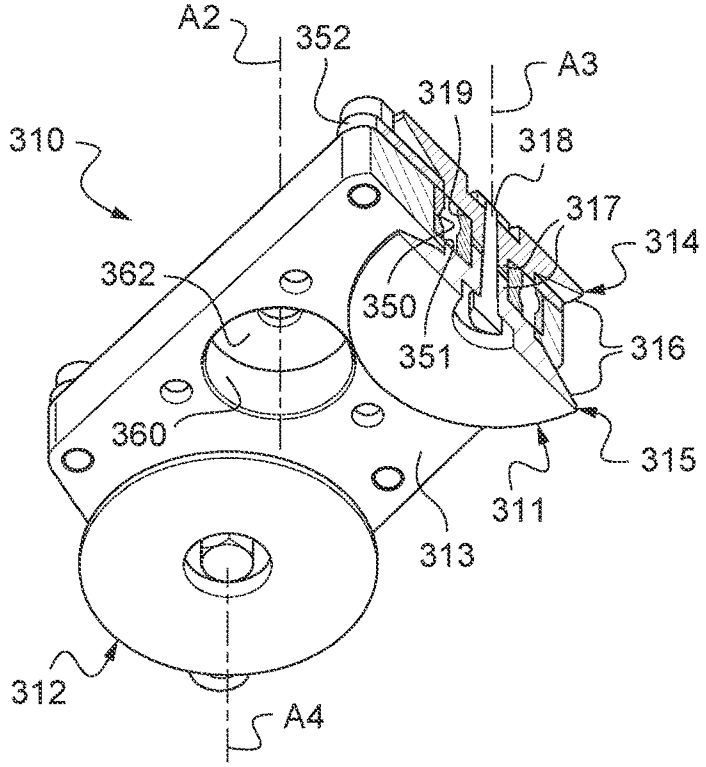
FIG. 3 is a schematic perspective view of a section of an element of the guide means of FIG. 2.

As shown in FIG. 3 in which one of the rollers 311 is shown in cross-section, each roller has two almost identical parts 314, 315 bolted to each other.

Thus, each of these two parts 314, 315 comprises a wheel 316 which is provided to roll against the crown 20 and which is pierced in its center by an opening, and a tube 317 which touches this opening on one side only.

These two parts 314, 315 are assembled by placing the two tubes 317 in the axis of one another, by threading a screw 318 through these tubes, and by screwing a nut at the end of this screw.

One of the parts of each roller has a recess to allow the body of the screw 318 to pass and the other part has a tapped hole in which the screw is tightened.

The nut serves as a mechanical brake to prevent loosening due to vibrations.

Each roller 311, 312 is rotatably mounted on the frame 313 around an axis A3, A4. To best reduce the friction between the frame 313 and the rollers 311, 312, ball bearings 319 are used here.

As shown in FIG. 3, the inner crown of the ball bearing 319 is mounted on the tubes 317 of the roller 311 and is held axially by the two wheels 316. Its outer crown is for its part engaged inside an opening 350 provided accordingly in the frame 313.

In practice, the two tubes 317 are fitted in the inner race of the ball bearing 319. The screw 318 acts as a clamp. Alternatively, an angular contact type bearing could be used. In this variant, the screw 318 would then also have a bearing preload function.

To block this outer crown axially, the opening 350 has in its bottom a shoulder 351 which forms a reduction in section. The frame 313 further comprises a plate 352 which is drilled in its center so as not to interfere with the roller 311 and which is screwed onto the body of the frame 313, so as to lock the outer crown of the ball bearing 319 against the shoulder 351.

The two wheels 316 of each roller 311, 312, 321, 322, 331, 332 are designed to roll along the outer face of the crown 20, so as to keep the latter centered on the axis of rotation A1.

The blocking of the crown 20 in height (along the axis of rotation A1) is here also ensured by the rollers.

For this, the two edges of the outer face of the crown 20 are chamfered so as to form paths for the two wheels 316 of each roller 311, 312, 321, 322, 331, 332, which hold the crown 20 axially between them.

Note here that the outer face of the crown 20 is grooved at mid-height, which allows it to accommodate part of the determining means 50 in an area where the wheels 316 do not roll.

As shown in FIG. 3, the frame 313 has a trapezium-shaped body, with two openings 350 to accommodate the two aforementioned ball bearings 319 and a central hole 360, of axis A2 (hereinafter called pivot axis A2) parallel to axes A3, A4.

This central hole 360 is partially closed on the upper side (opposite the base 10) by a wall 362 pierced in its center. It is used here to mount the frame 313 with a single mobility on the base 10, namely a pivoting mobility with respect to the base 10 around the pivot axis A2.

As shown in FIG. 2, each frame 313, 323, 333 is for this purpose mounted on a base 361 which is screwed onto the base 10 and the height of which is adjusted so that the rollers hold the crown 20 at the desired height. Each base 361 comprises a cylindrical stud (not visible in the figures) on which the central hole 360 of the frame 313, 323, 333 is engaged. Screwing means are used here to lock the wall 362 in contact with the top of this cylindrical stud, so as to lock the frame in height (along the pivot axis A2).

The three frames 313, 323, 333 are here regularly distributed around the axis of rotation A1, in the sense that their axes of pivots A2 are separated angularly two by two by 120 degrees around the axis of rotation A1.

The mobility of each frame around its pivot axis A2 makes it possible to ensure that the six rollers come to rest against the crown 20, by catching up with any defects or mounting clearances (this mobility makes it possible to obtain an isostatic mounting).

For the same purpose, only one of the frames 333 is mounted to move in translation on the base 10 along an axis A5 inclined or orthogonal with respect to the axis of rotation A1 (see FIG. 2). Here, this frame 333 is mounted to move in translation along an axis A5 perpendicular to the axis of rotation A1.

A slide system 340 is used for this, which comprises a mobile arm 341 to which the frame 333 is fixed, and a fixed hoop 342 which is fixed to the base 10.

The mobile arm 341 has several functions. It serves first of all as a base for the frame 333. It also receives the movable part of a miniature ball bearing slide (not visible in the figures) which guides its sliding. The slide has on its side a fixed part which is fixed to the base 10, either directly or via a riser.

This slide system 340 is equipped with elastic means, for example a spring (not visible in the figures) making it possible to return the rollers 331, 332 in the direction of the crown 20.

In this case, the fixed hoop 342 then has the sole function of receiving the springs and delivering the thrust to the mobile arm 341 to hold the crown 20 in place.

This slide system 340 has the major advantage of putting the ball bearings 319 in preload (that is to say of preloading them radially with respect to the axis of rotation A1), which avoids any flutter in the guide of the crown around the axis of rotation A1. It also makes it possible to take up any play between the rollers and the crown 20, in particular in the event of a temperature variation.

Preferably, the rollers and the crown are made of materials that reduce friction and whose resistance to contact pressures (in the sense of "Hertz pressure") is good.

They are also machined to have very low roughness, in order to further reduce friction.

Here, the crown 20 receives a surface treatment by Hard Anodic Oxidation (HARD) with Teflon sealing.

The rollers being very small compared to the crown 20, they are made of a titanium alloy of reduced mass and having good resistance to forces.

Figure 4:
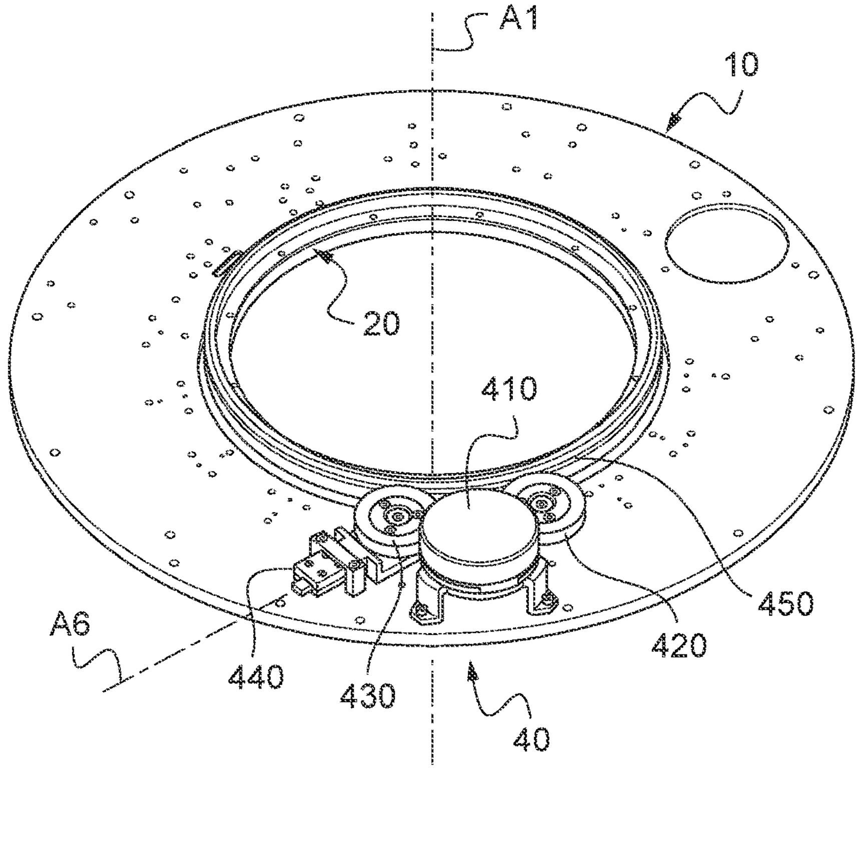
FIG. 4 is a schematic perspective view of the base and the drive means of the antenna support of FIG. 1.

The drive means 40 of the crown 20 in rotation around the axis of rotation A1 are illustrated in FIG. 4.

These drive means could take various forms. They could thus include a rack and pinion system or any other suitable system.

Here, the preferred drive solution uses pulleys and a belt 450 wound around crown 20.

This belt 450 is special in that it is made entirely of metallic material. It is presented here in the form of a simple strip of thin metal.

It thus has a coefficient of thermal expansion close to that of the pulleys which drive it, good resistance to temperature variations, reduced mass and good shock resistance.

The drive means 40 also include a motor 410 which drives the belt 450. This motor 410 is flat so as not to generate space depending on the thickness of the antenna support 1 (that is to say along axis of rotation A1). It thus has a diameter greater than its thickness. It may for example be a "brushless" type motor.

This motor 410 comprises a casing from which emerges an output shaft equipped with a driving pulley (not visible in FIG. 4) around which the belt 450 is wound.

As shown in FIG. 4, this box is attached to a tripod so that its output shaft points towards the base 10 and extends to the height of the crown 20.

In order to maximize the angular sector according to which the belt 450 is in contact with the drive pulley, the drive means also comprise two return pulleys 420, 430 located on either side of the belt 450, between the motor 410 and crown 20.

One of these return pulleys 420 is mounted with a single degree of freedom, namely rotational mobility relative to the base 10 around an axis parallel to the axis of rotation A1.

The other of the return pulleys 430 is mounted on the base 10 with a single mobility of rotation around an axis parallel to the axis of rotation A1 and a single mobility of translation along an axis A6 orthogonal to the axis of rotation A1.

Here, this axis A6 is chosen in such a way that, in the absence of a return pulley, it would be perpendicular to the corresponding strand of the belt 450. Thus, the axis A6 is median to the directions formed by the two stretched strands and straight lines of the belt which are on either side of the return pulley.

This other return pulley 430 is for this purpose equipped with a tensioning system 440 of identical architecture to that of the aforementioned slide system 340 (it thus comprises a movable arm which the return pulley is mounted on, a fixed arch which is fixed to the base, and elastic return means of the return pulley 430 resting against the belt 450).

This tensioning system 440 then makes it possible to constrain the belt 450 continuously so as to optimize the coefficient of adhesion between the belt 450 and the drive pulley to prevent any slippage. It also makes it possible to compensate for the dispersions of circularity of the pulleys and of the crown 20 as well as the differential expansions between the parts.

In FIG. 5, the means for determining the angular position of the crown 50 with respect to the base 10 around the axis of rotation A1 have been shown more precisely.

Here again, these means of determination could take different forms.

It would thus have been possible to use, instead of the aforementioned motor 410, a stepping motor which performs the functions of drive means and determining means. We could also have used an encoder wheel located in contact with the crown.

The preferred solution here for its precision and its cost consists in using an encoder strip 530 wound around the crown 20, and two encoder readers 510, 520 fixed to the support 10 and angularly separated from each other around the axis of rotation A1.

Here, the encoder strip 530 is a magnetic strip which is placed in the groove provided hollow in the outer face of the crown 20. It allows a measurement of the angular position of the crown 20 without contact, that is to say without friction or wear.

The encoder readers 510, 520 are suitable for measuring the magnetic field and therefore for detecting the variations of the magnetic field induced by the encoder strip 530 when the crown 20 rotates.

The encoder strip 530 indeed has a magnetic pattern which is repeated regularly over its length. This magnetic strip 530 is wound and glued to the crown 20. Its ends facing or in contact then generate an interruption in the continuity of the magnetic pattern which could generate a measurement fault.

The use of two separate encoder readers 510, 520 then makes it possible to measure the magnetic field in two separate places, so that one of the two readers can permanently perform an exact measurement of the angular position of the crown 50 by relative to the base 10 around the axis of rotation A1.

Here, the two encoder readers 510, 520 are fixed on bases 511, 521 screwed to the base 10.

Here, these two bases 511, 521 comprise means for adjusting the radial position of the code readers 510, 520 (relative to the axis of rotation A1), so as to be able to adjust the reading distance separating the latter from the code strip 530. For this, the holes for receiving the fixing screws of the bases 511, 521 have oblong shapes allowing adjustment of the radial position of the encoder readers 510, 520.

The second and third stages of the antenna support 1 have architectures homologous to that of the first stage described above.

Thus, the second stage comprises a second crown 20A on which a second antenna element can be fixed, second means 30A for guiding the second crown 20A in rotation around the axis of rotation A1, second drive means 40A in rotation of the second crown 20A around the axis of rotation A1, and second means for determining the angular position of the second crown 20A around the axis of rotation A1.

Similarly, the third stage comprises a third crown 20B on which a third antenna element can be fixed, third means 30B for guiding the third crown 20B in rotation around the axis of rotation A1, third drive means 40B in rotation of the third crown 20B around the axis of rotation A1, and third means for determining the angular position of the third crown 20B around the axis of rotation A1.

Here again, these guide means 30A, 30B, drive means 40A, 40B and determination means 50A, 50B are mounted on the base 10 on the outer side of the crowns 20, 20A, 20B.

The guide means 30, 30A, 30B are in particular designed to hold the three crowns 20, 20A, 20B one above the other, in a coaxially superimposed position.

The means for guiding 30A, 30B, for driving 40A, 40B and for determining 50A, 50B therefore comprise bases for fixing to the base 10 at different heights, so as to be at the desired height.

It will further be noted that, as shown in FIG. 1, the motors 410, 410 A, 410B for driving the belts are not all oriented in the same way, those driving the second and third crowns 20A, 20B being oriented in such a way that their drive pulleys 411A, 411B are facing upwards, unlike that shown in FIG. 4.

As explained above, the antenna support 1 is modular, in the sense that it makes it possible to receive antennas of different sizes by changing only a small number of its components.

In the example illustrated in the figures, the antenna support 1 is designed to accommodate an antenna of reduced dimensions (the diameter of its crowns is 300 mm).

It is then possible to consider a second antenna support, not shown, making it possible to receive a large antenna (the diameter of its crowns is 600 mm).

These two antenna supports will comprise bases 10 and crowns 20, 20A, 20B of different dimensions. Their belts and encoder strips will also have different lengths.

On the other hand, all of the other components of these two antenna supports may be identical. They will thus be able to use the same rollers, the same frames, the same motors and pulleys and the same code readers.

According to a preferred variant, the diameters of the drive pulleys may differ from one antenna support to another, which will make it possible to keep the same reduction ratio and therefore the same control software for the two antenna supports. Provision may be made for the setting of the control software to vary, to take account of the fact that the encoder will have a different resolution.

Another advantage is to guarantee sufficient winding of the belt around the driving pulley. Indeed, the larger the diameter of crown 20, the more inertia is there (keeping an identical crown section), which involves generating a higher driving torque.

The heights of these two antenna supports will then be the same, which will make it possible to minimize the aerodynamic profile and therefore the drag generated by these two antenna supports.

The present invention is in no way limited to the embodiment described and shown, but those skilled in the art will be able to add any variant in accordance with the invention.

Thus, if in the example described and illustrated, the belt is full, so that it could theoretically appear under certain operating conditions a slippage between the belt and the driving pulley, one could as a variant use a perforated belt, a crown notched and a notched drive pulley, ensuring perfectly synchronous operation of the drive means.

The invention claimed is:

1. Antenna support comprising:
- a base,
- at least one crown comprising securing means of an antenna element,
  - guide means for guiding the crown in rotation around an axis of rotation, the guide means cooperating with the crown so as to allow the crown a single degree of freedom so that the crown is rotatable about the axis of rotation of the crown,
  - drive means for driving the crown in rotation around the axis of rotation, and
  - determining means for determining the angular position of the crown around the axis of rotation,
- wherein the guide means, the drive means and the determining means are mounted on the base on the outer side of the crown.

2. Antenna support according to claim 1, wherein the guide means comprise at least three rollers distributed around the crown.

3. Antenna support according to claim 2, wherein the guide means comprise six rollers distributed in pairs on frames mounted on the base.

4. Antenna support according to claim 3, wherein each frame is pivotally mounted on the base, around a pivot axis parallel to the axis of rotation.

5. Antenna support according to claim 3, wherein one of the frames is mounted so as to be able to move in translation on the base along an inclined or orthogonal axis relative to the axis of rotation, said frame being biased towards the crown by an elastic return system.

6. Antenna support according to claim 1, wherein the drive means comprise a motor which drives a belt wound around the crown.

7. Antenna support according to claim 6, wherein the belt is entirely metallic.

8. Antenna support according to claim 6, wherein the drive means comprise two return pulleys located on either side of the belt, between the motor and the crown.

9. Antenna support according to claim 8, wherein at least one of the return pulleys is mounted to move in translation on the support along an axis orthogonal to the axis of rotation and is biased against the belt by a tensioning system.

10. Antenna support according to claim 1, wherein the determining means comprise an encoder strip wound around the crown, and two encoder readers fixed to the support and angularly separated from each other around the axis of rotation.

11. Antenna support according to claim 1, wherein there is provided:
- at least one second crown comprising means for securing a second antenna element,
  - second guide means for guiding the second crown in rotation around the axis of rotation,
  - second drive means for driving the second crown in rotation around the axis of rotation, and
  - second determining means for determining the angular position of the second crown around the axis of rotation, and
- wherein the second guide means, the second drive means and the second determining means are mounted on the base on the outer side of the second crown.

12. Antenna support according to claim 11, wherein there is provided:
- at least a third crown comprising means for securing a third antenna element,
  - third guide means for guiding the third crown in rotation around the axis of rotation,
  - third drive means for driving the third crown in rotation around the axis of rotation, and
  - third determining means for determining the angular position of the third crown around the axis of rotation, and
- wherein the third guide means, the third drive means and the third determining means are mounted on the base on the outer side of the third crown.

13. Set of two antenna supports according to claim 1, wherein each crown of one of the antenna supports has a different diameter from that of each crown of the other of the antenna supports, and wherein the guide means, part of the drive means and part of the determining means are identical in the two antenna supports.

14. Vehicle comprising means of propulsion, an antenna and an antenna support according to claim 1.

* * * * *